(12) United States Patent
Abe et al.

(10) Patent No.: US 7,574,180 B2
(45) Date of Patent: Aug. 11, 2009

(54) TRANSMITTER

(75) Inventors: Kensaku Abe, Saitama (JP); Nobuo Kobayashi, Tokyo (JP); Hiroyoshi Sawama, Chiba (JP); Kenji Tokushige, Tokyo (JP)

(73) Assignee: Sony Corporation (JP)

( * ) Notice: Subject to any disclaimer, the term of this patent is extended or adjusted under 35 U.S.C. 154(b) by 621 days.

(21) Appl. No.: 11/177,144

(22) Filed: Jul. 8, 2005

(65) Prior Publication Data

US 2006/0019616 A1  Jan. 26, 2006

(30) Foreign Application Priority Data

Jul. 20, 2004  (JP) .......................... P2004-211785

(51) Int. Cl.
*H04B 1/66* (2006.01)
*H04M 1/00* (2006.01)

(52) U.S. Cl. .................................. 455/102; 455/569.2

(58) Field of Classification Search ................... 455/93, 455/102, 110, 113, 344, 345, 347, 351, 556.1, 455/557, 569.1, 569.2, 575.1, 575.9
See application file for complete search history.

(56) References Cited

U.S. PATENT DOCUMENTS 5,654,723 A * 8/1997 Craven et al. ............... 343/742
6,008,657 A * 12/1999 Suyama et al. ............. 324/639
6,304,764 B1 * 10/2001 Pan ........................ 455/569.2
6,731,920 B1 * 5/2004 Iwai et al. .................. 455/272

FOREIGN PATENT DOCUMENTS

| JP | 62076328 A | * | 4/1987 |
|---|---|---|---|
| JP | 62-200924 A | | 9/1987 |
| JP | 63-194424 A | | 8/1988 |
| JP | 03-117932 A | | 5/1991 |
| JP | 06-309854 A | | 11/1994 |
| JP | 07-307692 A | | 11/1995 |

* cited by examiner

*Primary Examiner*—Quochien B Vuong
(74) *Attorney, Agent, or Firm*—Lerner, David, Littenberg, Krumholz & Mentlik, LLP (57) ABSTRACT

A transmitter for modulating an externally supplied audio signal according to a predetermined modulation system and for transmitting an obtained modulation signal includes a modulator for modulating the audio signal according to the modulation system; a balance convertor for converting the modulation signal in an unbalanced mode generated by the modulator into a balanced mode; and an antenna having a predetermined length formed by a leakage transmission line, the antenna emitting the modulation signal converted into the balanced mode.

2 Claims, 9 Drawing Sheets

| CONTROL DATA | | | | SET FREQUENCY | VALUE OF X |
|---|---|---|---|---|---|
| D0 | D1 | D2 | D3 | | |
| L | H | H | H | 76.8MHz | 768 |
| H | L | H | H | 77.0MHz | 770 |
| L | L | H | H | 77.2MHz | 772 |
| H | H | L | H | 77.4MHz | 774 |
| L | H | L | H | 77.6MHz | 776 |
| H | L | L | H | 77.8MHz | 778 |
| L | L | L | H | 78.0MHz | 780 |
| H | H | H | L | 88.0MHz | 880 |
| H | L | L | L | 88.2MHz | 882 |
| L | H | H | L | 88.4MHz | 884 |
| H | L | H | L | 88.6MHz | 886 |
| L | L | H | L | 88.8MHz | 888 |
| H | H | L | L | 89.0MHz | 890 |
| L | H | L | L | 89.2MHz | 892 |

FIG. 8

TRANSMITTER

CROSS REFERENCES TO RELATED APPLICATIONS

The present application claims priority from Japanese Patent Application No. JP 2004-211785, filed in the Japanese Patent Office on Jul. 20, 2004, the entire content of which is incorporated herein by reference.

BACKGROUND OF THE INVENTION

1. Field of the Invention

The present invention relates to transmitters, and more particularly, to an on-vehicle portable frequency-modulation transmitter, that is, a so-called FM transmitter.

2. Description of the Related Art

FM transmitters have been available as accessories for vehicles on which playback apparatuses, such as cassette tape players, compact disk (CD) players, or minidisk (MD) players, are not mounted.

Figure 8:
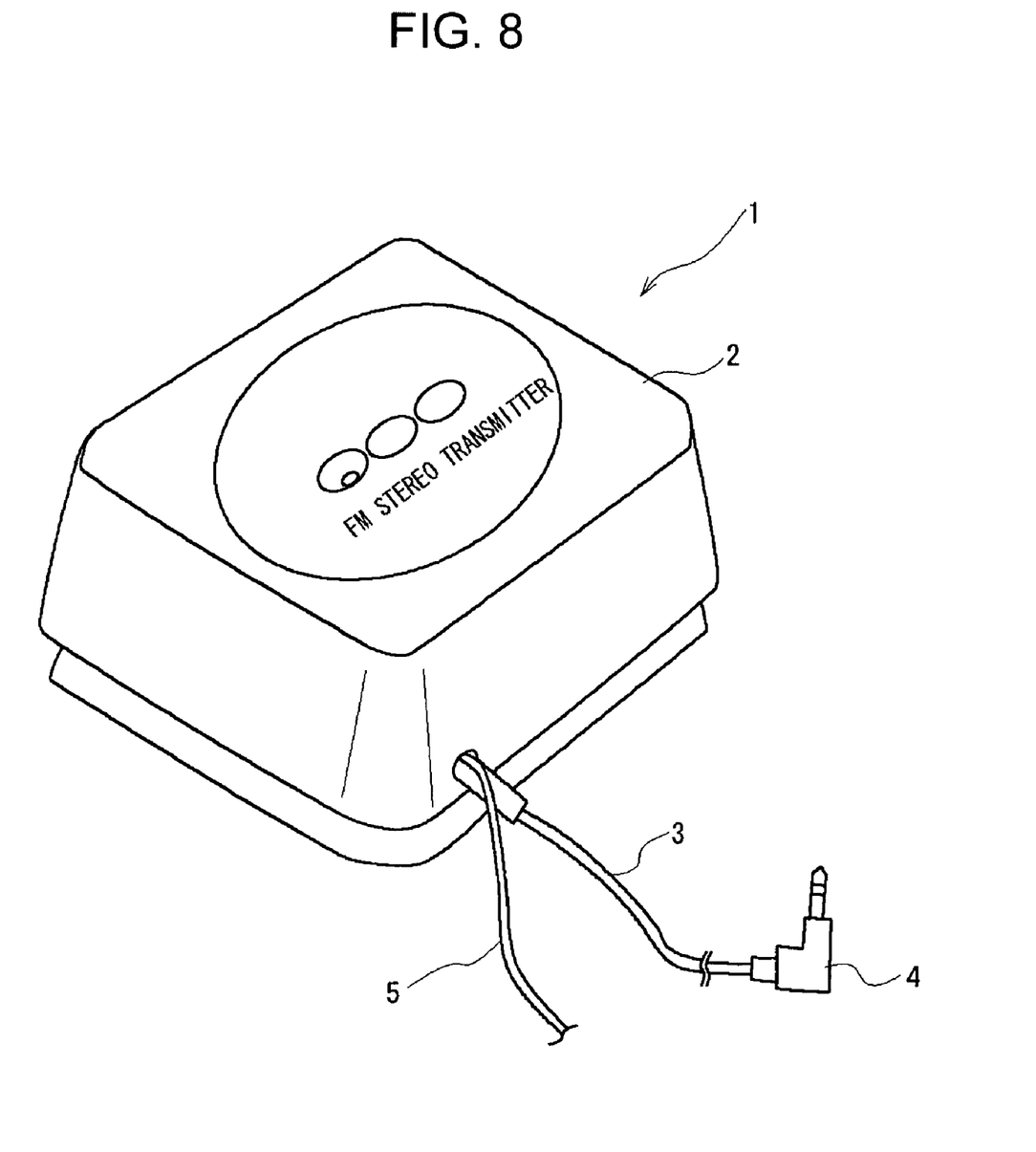
FIG. 8 is a perspective view of the external structure of a known FM transmitter.

For example, as shown in FIG. 8, an FM transmitter 1 includes a stereo mini plug 4 provided at a leading end of a cord 3 extending from a casing 2. The FM transmitter 1 is used such that the stereo mini plug 4 is inserted into a headphone jack of a portable audio apparatus, such as a cassette tape recorder, a CD player, or an MD player. Playback sound acquired from the portable audio apparatus is FM-modulated by a circuit board accommodated within the casing 2 and transmitted at a predetermined frequency via an antenna 5. (See, for example, the home page of TDK Marketing Corporation, searched on Jul. 18, 2004, Thus, even in a vehicle on which a cassette tape recorder or the like is not mounted, a user of the FM transmitter 1 is able to listen to playback sound from a cassette tape or the like played back by a portable audio apparatus via a car stereo by receiving FM radio waves via a car radio antenna of the vehicle.

Figure 9:
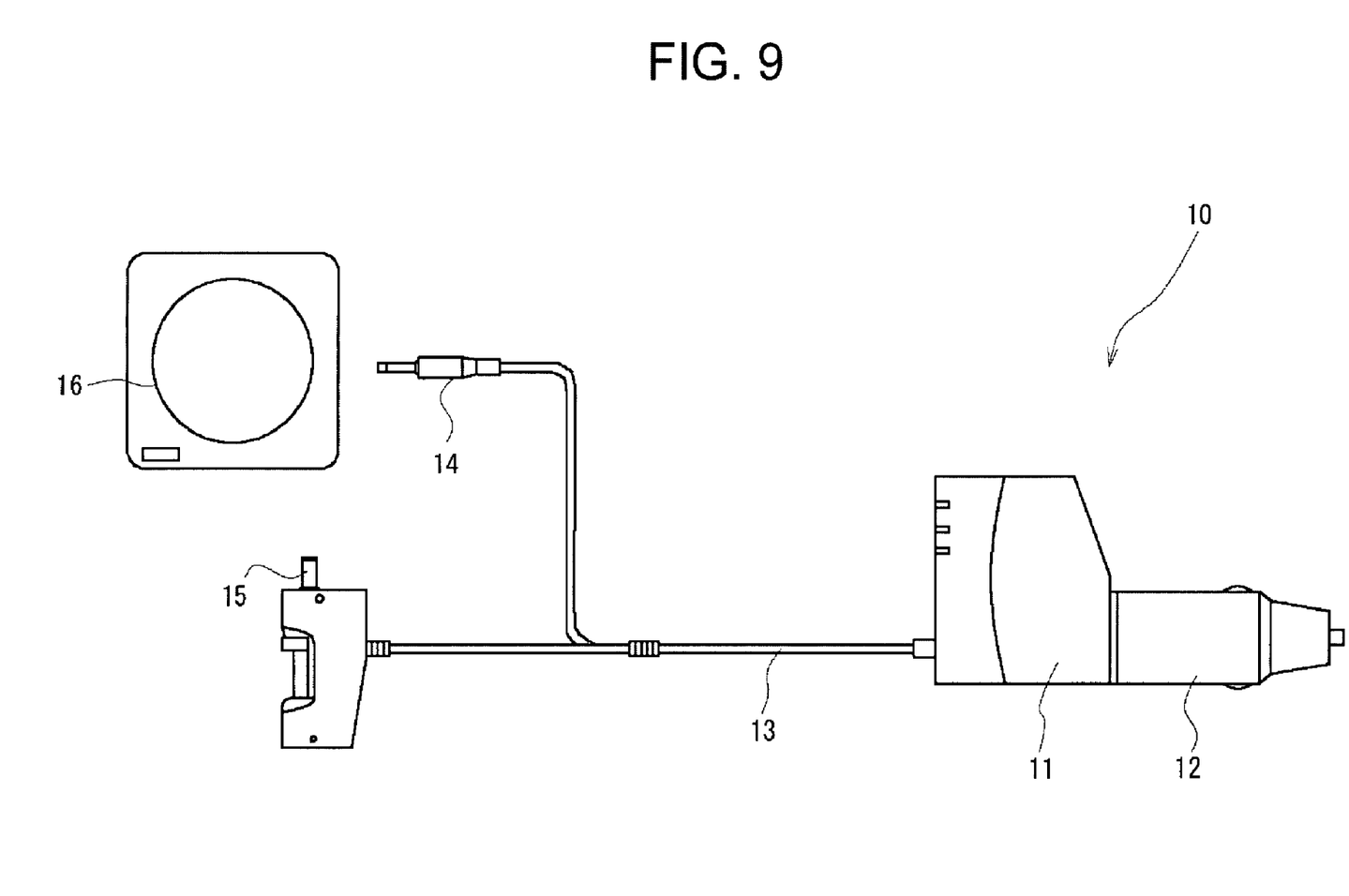
FIG. 9 is a perspective view of the external structure of a known FM transmitter.

In addition to the FM transmitter 1 shown in FIG. 8 in which a battery is used as a power source, for example, an FM transmitter 10 shown in FIG. 9 in which a cigar lighter socket of a vehicle supplies power is available. (See, for example, the home page of Audio-Technical Corporation, searched on Jul. 18, 2004, The FM transmitter 10 includes a cigar lighter plug 12 provided at a leading end of a casing 11. By inserting the cigar lighter plug 12 into a cigar lighter socket (not shown) of the vehicle, power is supplied from the cigar lighter socket to the FM transmitter 10.

In addition, the FM transmitter 10 further includes a stereo mini plug 14 and a direct current (DC) power plug 15 provided at a leading end of a cable 13 extending from the casing 11. By inserting the stereo mini plug 14 into a headphone jack (not shown) of a portable audio apparatus 16 and by inserting the DC power plug 15 into a DC power terminal (not shown) of the portable audio apparatus 16, audio signals of playback sound from the portable audio apparatus 16 are input to the FM transmitter 10 while driving power is supplied to the portable audio apparatus 16.

In the FM transmitter 10, the audio signals input from the portable audio apparatus 16 are FM-modulated by an FM modulation circuit accommodated within the casing 11, and the FM-modulated audio signals are transmitted at a predetermined frequency via an antenna (not shown) accommodated within the casing 11.

SUMMARY OF THE INVENTION

Since the FM transmitter 1 shown in FIG. 8 uses a battery as a power source, the FM transmitter 1 achieves high portability. Thus, the FM transmitter 1 can be used in a desired position in a vehicle. However, the FM transmitter 1 is likely to be affected by the environment. In addition, depending on the position in a vehicle, FM radio waves transmitted from the FM transmitter 1 may be blocked by the body of the vehicle. Thus, FM radio waves may not be received at an antenna of the vehicle with a radio field intensity that is adequate from a practical point of view.

The FM transmitter 10 shown in FIG. 9 can be used in only a limited position in a vehicle. In addition, depending on the structure of the vehicle or depending on the position of an antenna of the vehicle, FM radio waves transmitted from the FM transmitter 10 may not be received at the antenna with a radio field intensity that is adequate from a practical point of view.

It is desirable to provide a transmitter that is less likely to be affected by the environment and that achieves stable transmission of radio waves.

According to an embodiment of the present invention, a transmitter includes modulation means for modulating an audio signal according to a predetermined modulation system, balance conversion means for converting an unbalanced modulation signal from an unbalanced mode to a balanced mode, and an antenna having a predetermined length formed by a leakage transmission line, the antenna emitting the modulation signal converted into the balanced mode.

As a result, the transmitter ensures a transmission quality adequate from a practical point of view even in a space having a large environmental change. In addition, adopting the balance conversion means causes the transmitter to be much less likely to be affected by the use environment and enables stable transmission of radio waves.

According to an embodiment of the present invention, a transmitter for modulating an externally supplied audio signal according to a predetermined modulation system and for transmitting an obtained modulation signal includes modulation means for modulating the audio signal according to the modulation system, balance conversion means for converting the modulation signal in an unbalanced mode generated by the modulation means into a balanced mode, and an antenna having a predetermined length formed by a leakage transmission line, the antenna emitting the modulation signal converted into the balanced mode. Thus, even in a space having a large environmental change, a transmission quality adequate from a practical point of view can be ensured. In addition, transmitting the modulation signal in the balanced mode causes the transmitter to be much less likely to be affected by the use environment and enables stable transmission of radio waves. Thus, a transmitter that is less likely to be affected by the environment and that enables stable transmission of radio waves can be achieved.

DESCRIPTION OF THE PREFERRED EMBODIMENTS

Embodiments of the present invention will be described with reference to the drawings.

Figure 1:
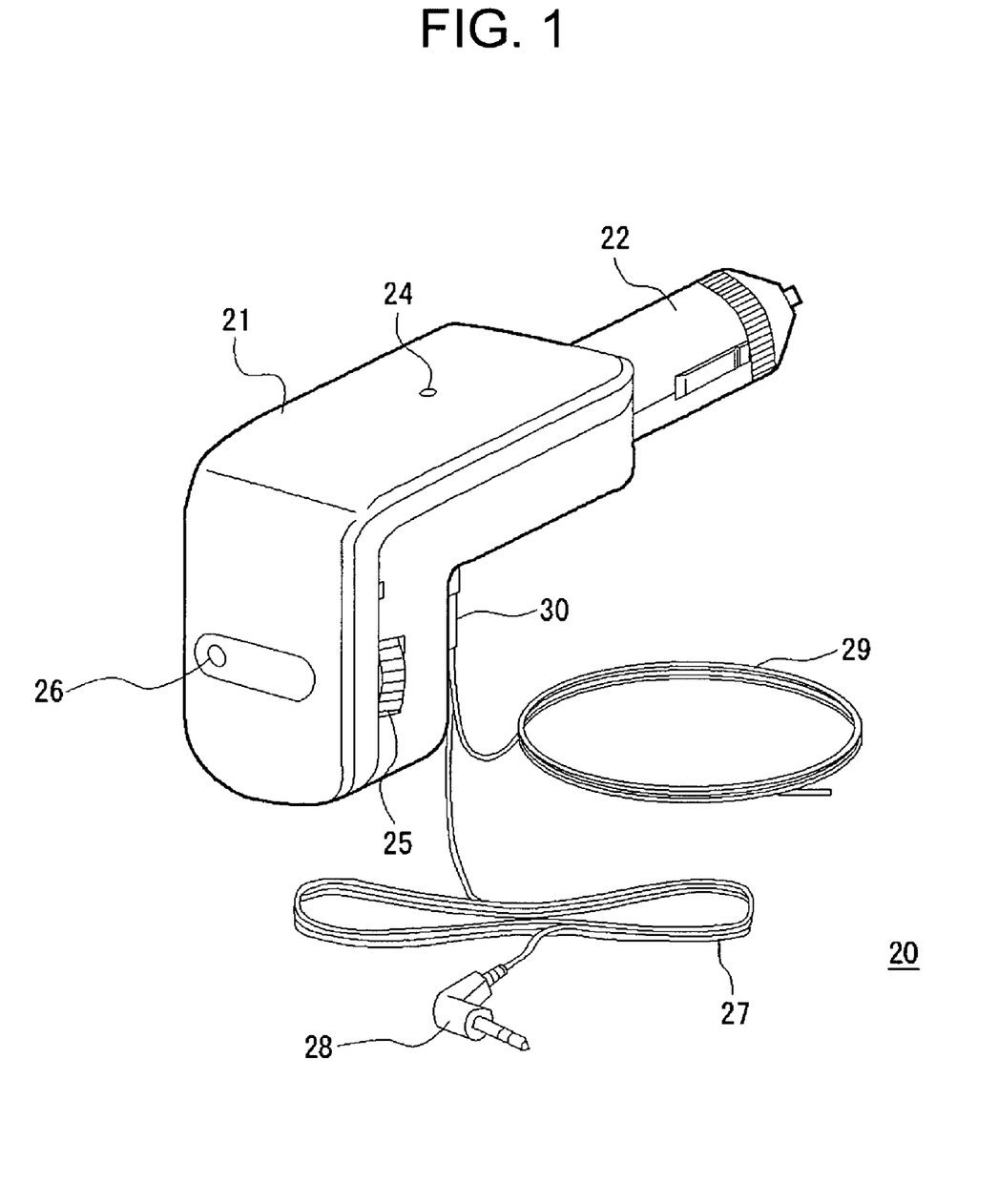
FIG. 1 is a perspective view showing the external structure of an FM transmitter according to an embodiment of the present invention.
Figure 2:
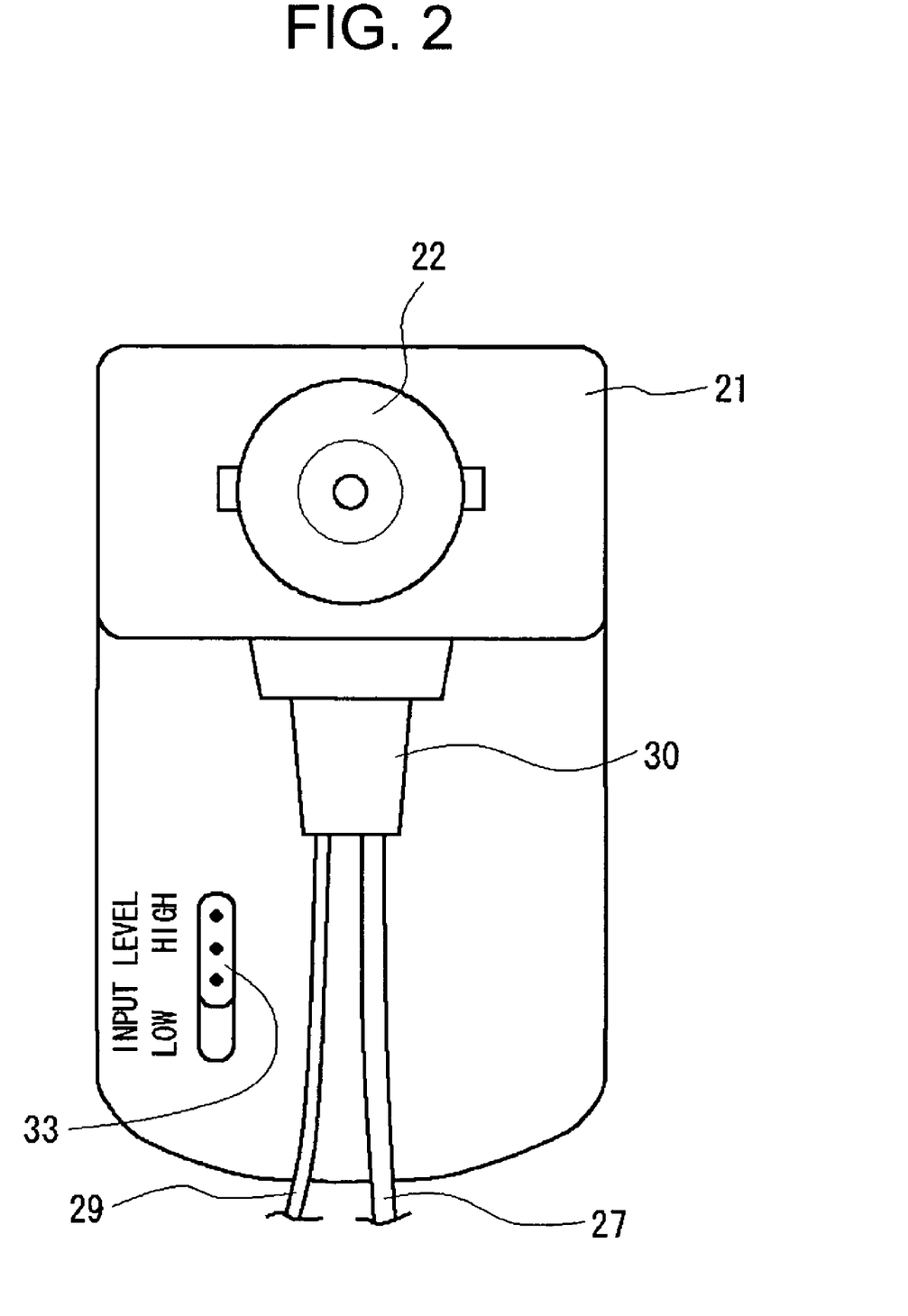
FIG. 2 is a front view showing the external structure of the FM transmitter according to the embodiment.
Figure 3:
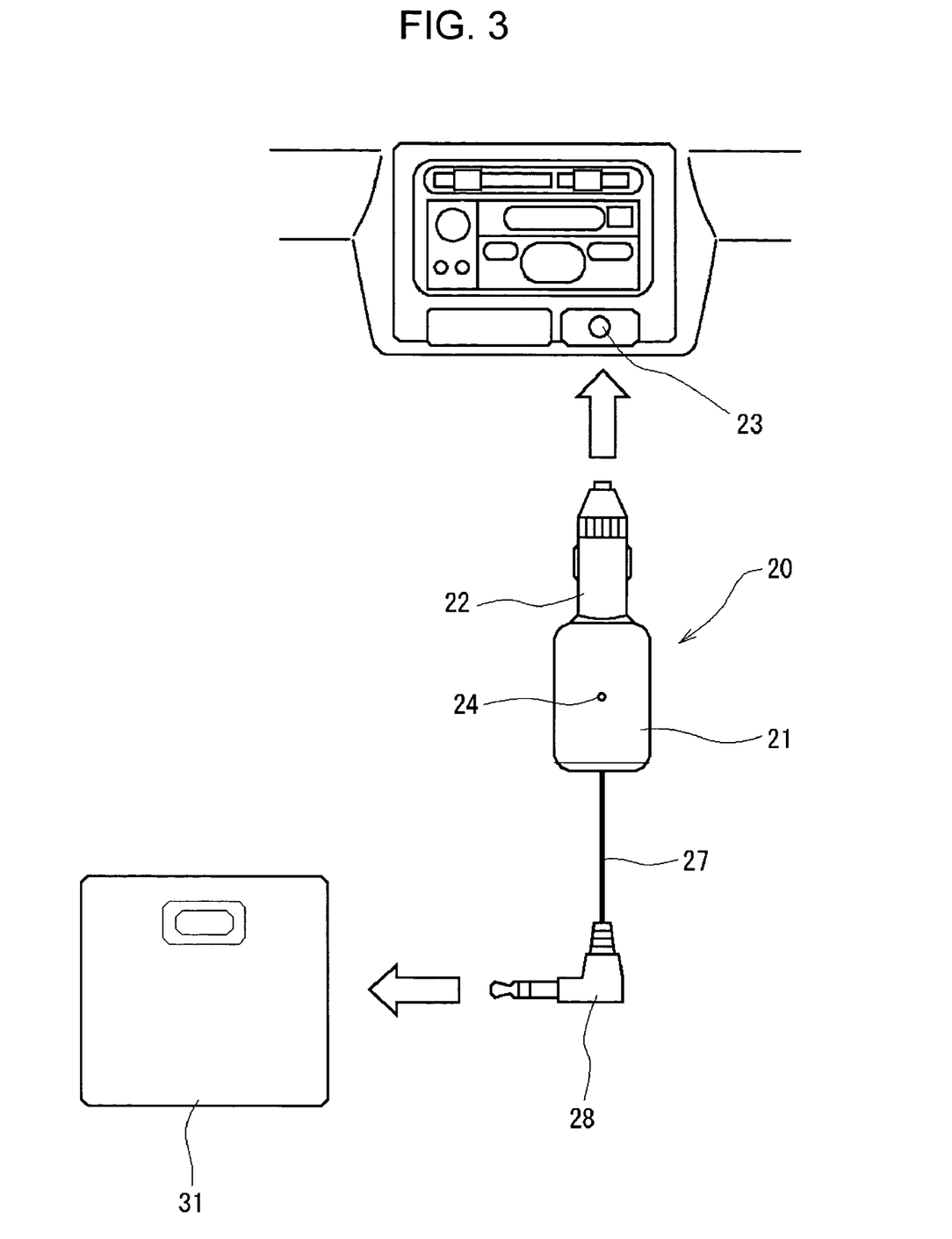
FIG. 3 is a schematic diagram showing an operating state of the FM transmitter according to the embodiment.

FIGS. 1 and 2 show the external structure of an FM transmitter according to an embodiment of the present invention. An FM transmitter 20 includes a cigar lighter plug 22 provided at a leading end of an L-shaped bent casing 21. By inserting the cigar lighter plug 22 into a cigar lighter socket 23 inside a vehicle, as shown in FIG. 3, power is supplied from the cigar lighter socket 23 to the FM transmitter 20.

A power lamp 24 is provided on a top face of the casing 21. A user is able to determine whether or not power is being supplied from the cigar lighter socket 23 to the FM transmitter 20 by seeing whether or not the power lamp 24 is turned on.

A rotatable frequency selection dial 25 is provided at a rear end of the downward-bent casing 21. Transmit frequencies that can be set are written on a front face of the frequency selection dial 25 with predetermined angular spaces there between. A window 26 is provided at the rear end of the casing 21 so as to correspond to the frequency selection dials 25.

In the FM transmitter 20, a desired transmit frequency is selected from among the transmit frequencies written on the frequency selection dial 25. By adjusting the rotation position of the frequency selection dial 25, the set transmit frequency can be seen through the window 26. Thus, the frequency of FM radio waves transmitted from the FM transmitter 20 can be set to the desired transmit frequency.

A cord 27 and an antenna cable 29 extend from a back face of the casing 21 and are retained by a bush 30 provided for exit protection. One end of each of the cord 27 and the antenna cable 29 is connected to a circuit board (not shown) accommodated within the casing 21.

A headphone mini plug 28 is provided at a leading end of the cord 27. Thus, by inserting the headphone mini plug 28 into a headphone jack (not shown) of a portable audio apparatus 31, such as a cassette tape recorder, as shown in FIG. 3, audio signals of playback sound output from the portable audio apparatus 31 are input to the FM transmitter 20.

The antenna cable 29 is formed by covering a twisted-pair cable with a flexible insulator. A leading end of the twisted-pair cable is terminated with, for example, 100 Ω, and the twisted-pair cable has a characteristic impedance of, for example, 100 Ω. Thus, leakage radio waves can be generated along the antenna cable 29.

Figure 4A:
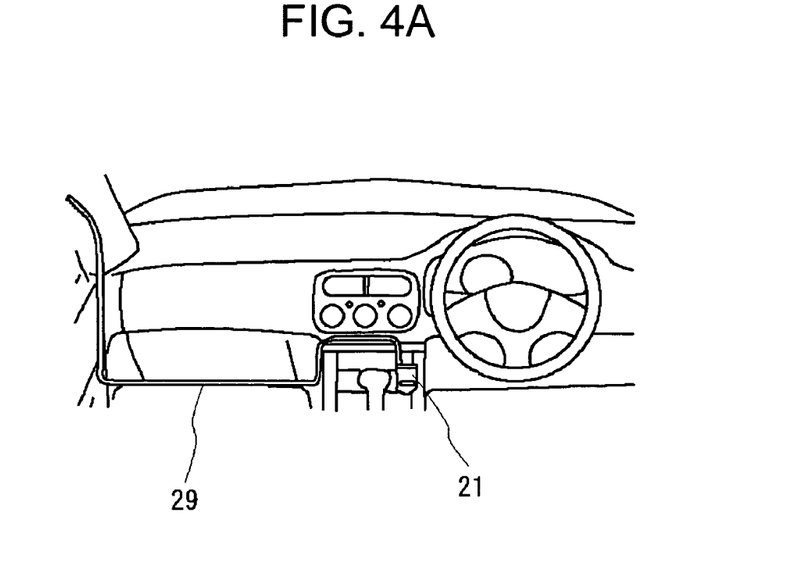
FIGS. 4A and 4B are schematic diagrams showing operating states of the FM transmitter according to the embodiment.
Figure 4B:
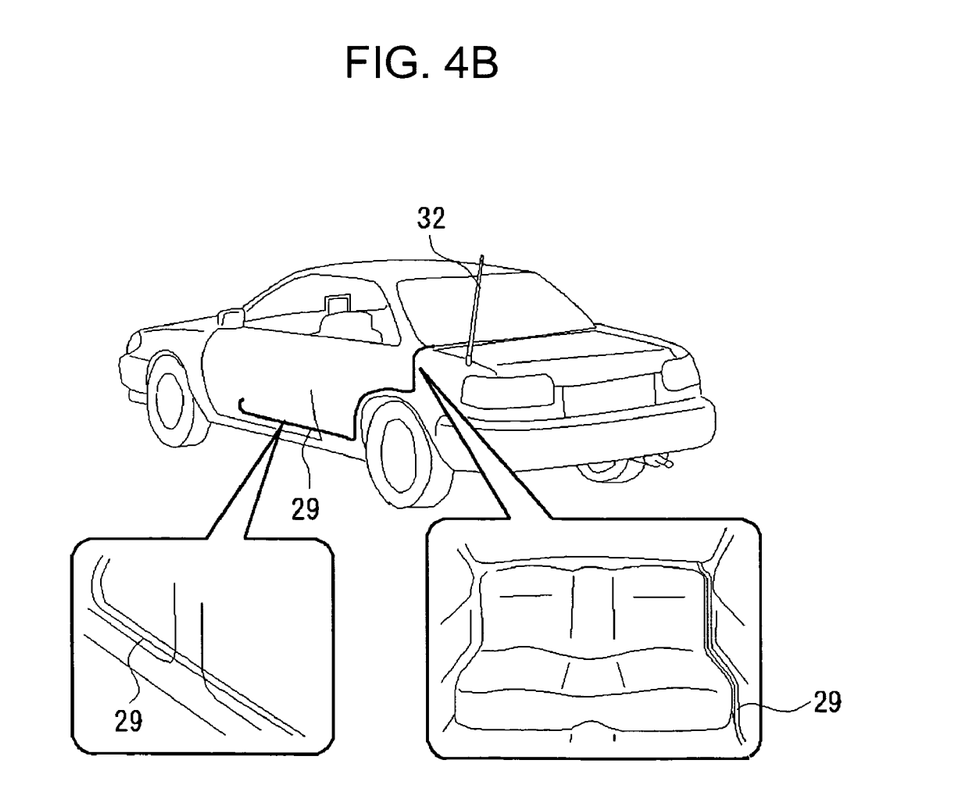

Taking into consideration the portability of the FM transmitter 20 and the length of a typical vehicle, the length of the antenna cable 29 is set to about three meters. If an antenna 32 (shown in FIG. 4B) of a vehicle is located at a front portion of the vehicle, the antenna cable 29 is mounted along the interior trim of the vehicle as shown in FIG. 4A. If the antenna 32 of the vehicle is located at a rear portion of the vehicle, the antenna cable 29 is mounted along the interior trim of the vehicle as shown in FIG. 4B. Thus, leakage radio waves from the antenna cable 29 are received at the antenna 32 of the vehicle with a radio field intensity that is adequate from a practical point of view.

Thus, a user of the FM transmitter 20 is able to listen to sound in a good condition based on FM radio waves transmitted from the FM transmitter 20 via a car stereo, irrespective of the type of vehicle in which the FM transmitter 20 is used.

The FM transmitter 20 includes an input level switch 33 provided on the back face of the casing 21, as shown in FIG. 2. In the FM transmitter 20, the input level switch 33 is normally set to "high". However, when the volume of playback sound output from a car stereo is small even if the volume of the connected portable audio apparatus 31 (see FIG. 3) is turned up, the input level switch 33 is set to "low". Thus, the volume of the playback sound can be increased.

Figure 5:
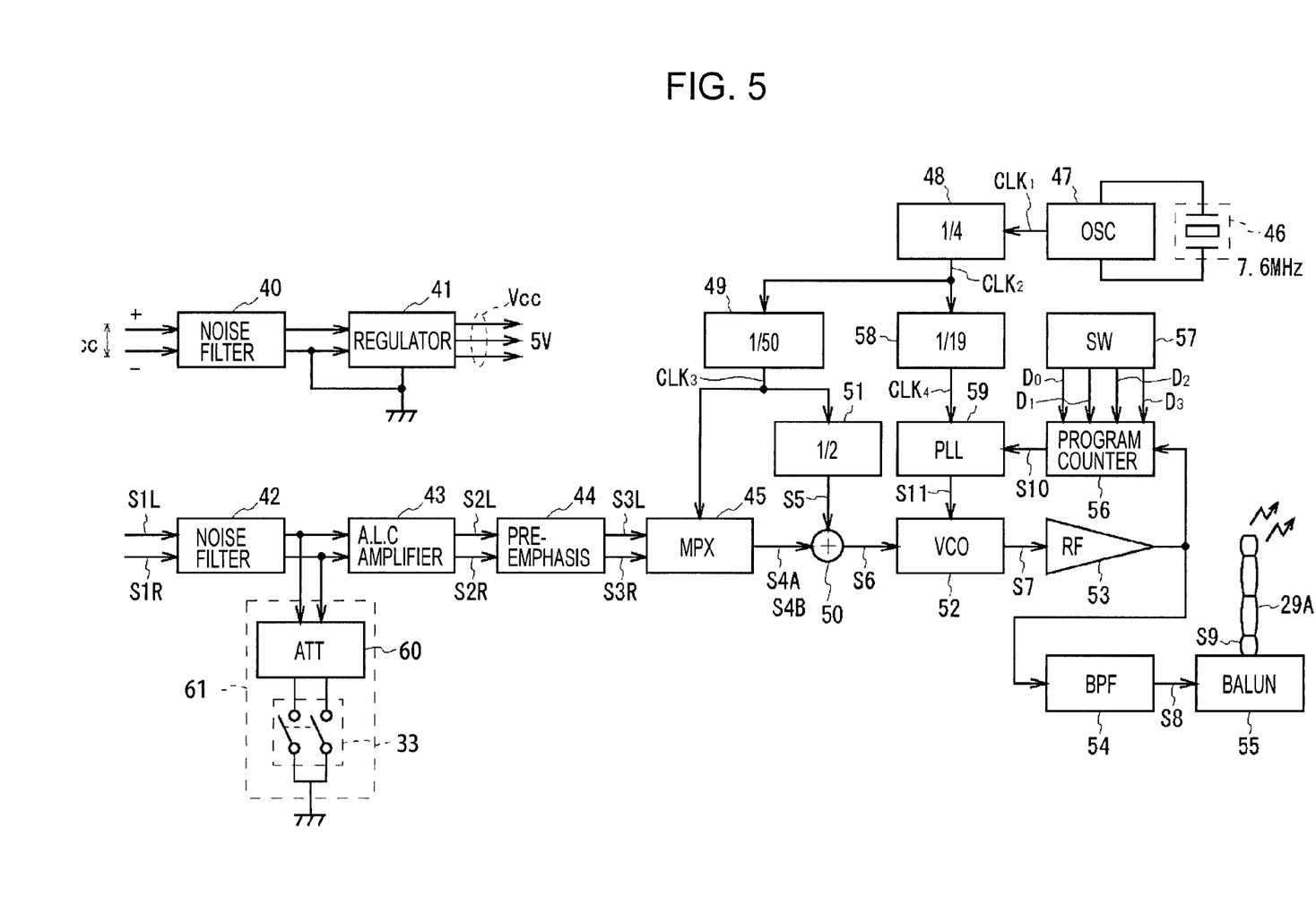
FIG. 5 is a block diagram showing the internal structure of the FM transmitter according to the embodiment.

FIG. 5 shows the circuit structure of the circuit board (not shown) accommodated within the casing 21 of the FM transmitter 20.

Referring to FIG. 5, in the FM transmitter 20, a power supply voltage VCC of 12 V or 24 V supplied from a vehicle-mounted battery via a cigar lighter jack is input to a regulator circuit 41 via a noise filter 40. The regulator circuit 41 transforms the input power supply voltage VCC into 5 V, and the transformed power supply voltage is supplied as a driving voltage VCC' to each circuit block.

In addition, in the FM transmitter 20, audio signals S1L and S1R for left and right channels supplied from the portable audio apparatus 31 connected via the headphone mini plug 28 are input to an automatic level control amplifying circuit 43 via a noise filter circuit 42.

A level adjusting circuit 61 including an attenuator 60 and the input level switch 33 is provided between the noise filter circuit 42 and the automatic level control amplifying circuit 43. When the input level switch 33 is set to "high" or "low", the attenuator 60 and the ground are connected or disconnected, respectively.

Thus, when the input level switch 33 is set to "high", the audio signals S1L and S1R are attenuated and input to the automatic level control amplifying circuit 43. In contrast, when the input level switch 33 is set to "low", the audio signals S1L and S1R are input to the automatic level control amplifying circuit 43 without being attenuated.

The automatic level control amplifying circuit 43 performs amplification and amplitude limiting processing on the supplied audio signals S1L and S1R for the left and right channels to produce amplitude-limited audio signals S2L and S2R. The automatic level control amplification circuit 43 transmits the obtained amplitude-limited audio signals S2L and S2R to a preemphasis circuit 44.

The preemphasis circuit 44 performs 75 microsecond preemphasis for emphasizing high-bandwidth components including many noise components, that is, preemphasis for emphasizing high-bandwidth components of 2.2 kHz or more, on the amplitude-limited audio signals S2L and S2R to produce preemphasis audio signals S3L and S3R. Then, the preemphasis circuit 44 supplies the obtained preemphasis audio signals S3L and S3R to a multiplexer circuit 45.

A 7.6-MHz clock CLK1 is generated by an oscillator circuit 47 using a quartz crystal 46 as an oscillator. The clock CLK1 is ¼ frequency-divided by a first frequency divider 48 to produce a 1.9-MHz clock CLK2. The clock CLK2 is 1/50 frequency-divided by a second frequency divider 49 to produce a 38-kHz clock CLK3. The clock CLK3 is supplied to the multiplexer circuit 45.

The multiplexer circuit 45 generates a sum signal S4A in an AM-FM system of FM stereo broadcasting by adding the supplied preemphasis audio signals S3L and S3R for the left and right channels. The multiplexer circuit 45 also generates a difference signal S4B in the AM-FM system by subtracting the preemphasis audio signal S3R for the right channel from the preemphasis audio signal S3L for the left channel and by multiplying the 38-kHz clock CLK3 by the subtraction result. Then, the multiplexer circuit 45 transmits the sum signal S4A and the difference signal S4B to an adding circuit 50.

The 38-kHz clock CLK3 output from the second frequency divider 49 is ½ frequency-divided by a third frequency divider 51 to produce a pilot signal S5 of a 19-kHz clock. The pilot signal S5 is supplied to the adding circuit 50. The pilot signal S5 is used as a reference signal when a receiving side generates audio signals for the left and right channels in accordance with the sum signal S4A and the difference signal S4B. Thus, the adding circuit 50 adds the sum signal S4A, the difference signal S4B, and the pilot signal S5, and obtains a stereo composite signal S6. The adding circuit 50 transmits the stereo composite signal S6 to a voltage-controlled oscillator circuit 52.

A carrier frequency determination unit including a diode, a trimmer capacitor, and a coil is provided as an input stage of the voltage-controlled oscillator circuit 52. The voltage-controlled oscillator circuit 52 FM-modulates the supplied stereo composite signal S6 to generate an FM modulation signal S7 at a carrier frequency corresponding to the capacitance of the diode, the trimmer capacitor, and the coil of the carrier frequency determination unit. The voltage-controlled oscillator circuit 52 transmits the generated FM modulation signal S7 to a band pass filter circuit 54 via a radio frequency (RF) amplifying circuit 53.

The band pass filter circuit 54 extracts only signal components in a range between 76 MHz and 90 MHz, which is a transmission range of the FM transmitter 20, from the supplied FM modulation signal S7, and transmits the extracted signal components as an FM modulation signal S8 to a balun 55.

Figure 6A:
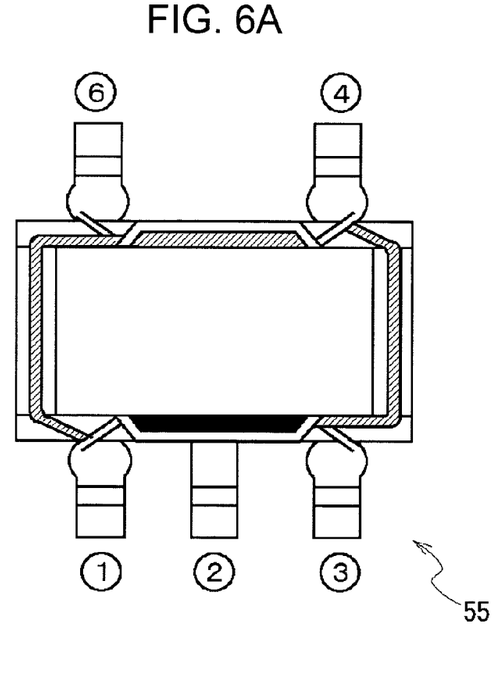
FIG. 6A to 6C show the structure of a balun.
Figure 6B:
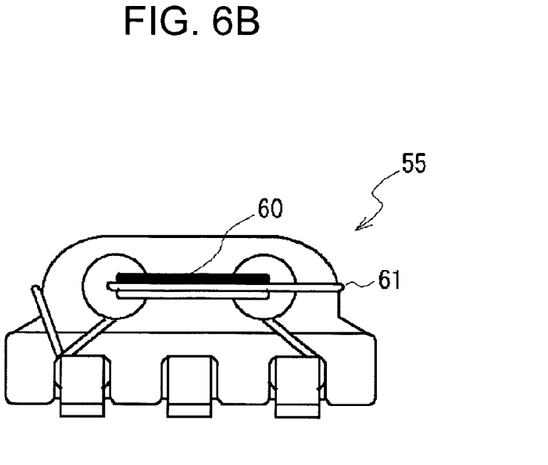
Figure 6C:
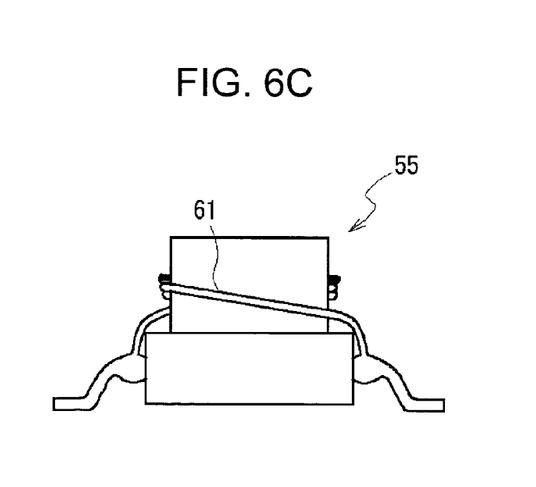
Figure 6D:
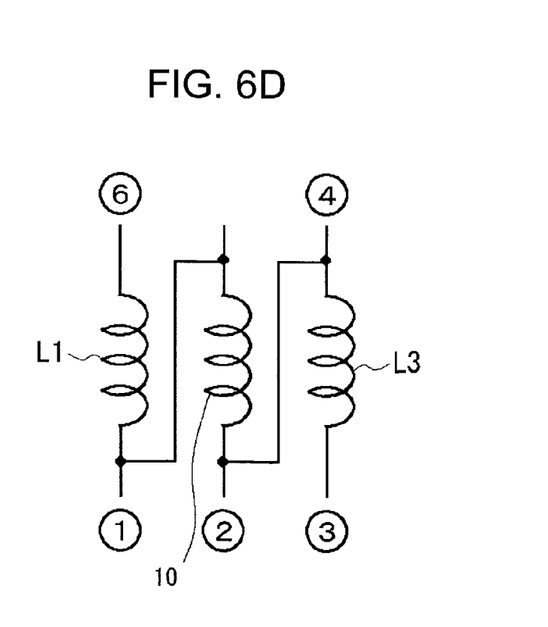
FIG. 6D is an equivalent circuit diagram of the balun.

The balun 55 is formed by winding three leads 61 around a core 60 made of, for example, a Ni—Zn ferrite, as shown in FIGS. 6A to 6C. The balun 55 has an equivalent circuit structure in which first to third coils L1 to L3 are connected in series with each other, as shown in FIG. 6D. The balun 55 converts the unbalanced FM modulation signal S8 from an unbalanced mode to a balanced mode, and obtains a balanced FM modulation signal S9. The balun 55 supplies the balanced FM modulation signal S9 to a twisted-pair cable 29A contained in the antenna cable 29. Accordingly, the FM modulation signal S9 is leaked out and emitted from the antenna cable 29.

In contrast, the FM modulation signal S7 output from the RF amplifier 53 is also supplied to a program counter circuit 56. Here, the program counter circuit 56 receives from a switching circuit 57 control signals D0 to D3 for four channels corresponding to the transmit frequency of the FM transmitter 20 set by operating the frequency selection dial 25 (see FIG. 1).

Figure 7:
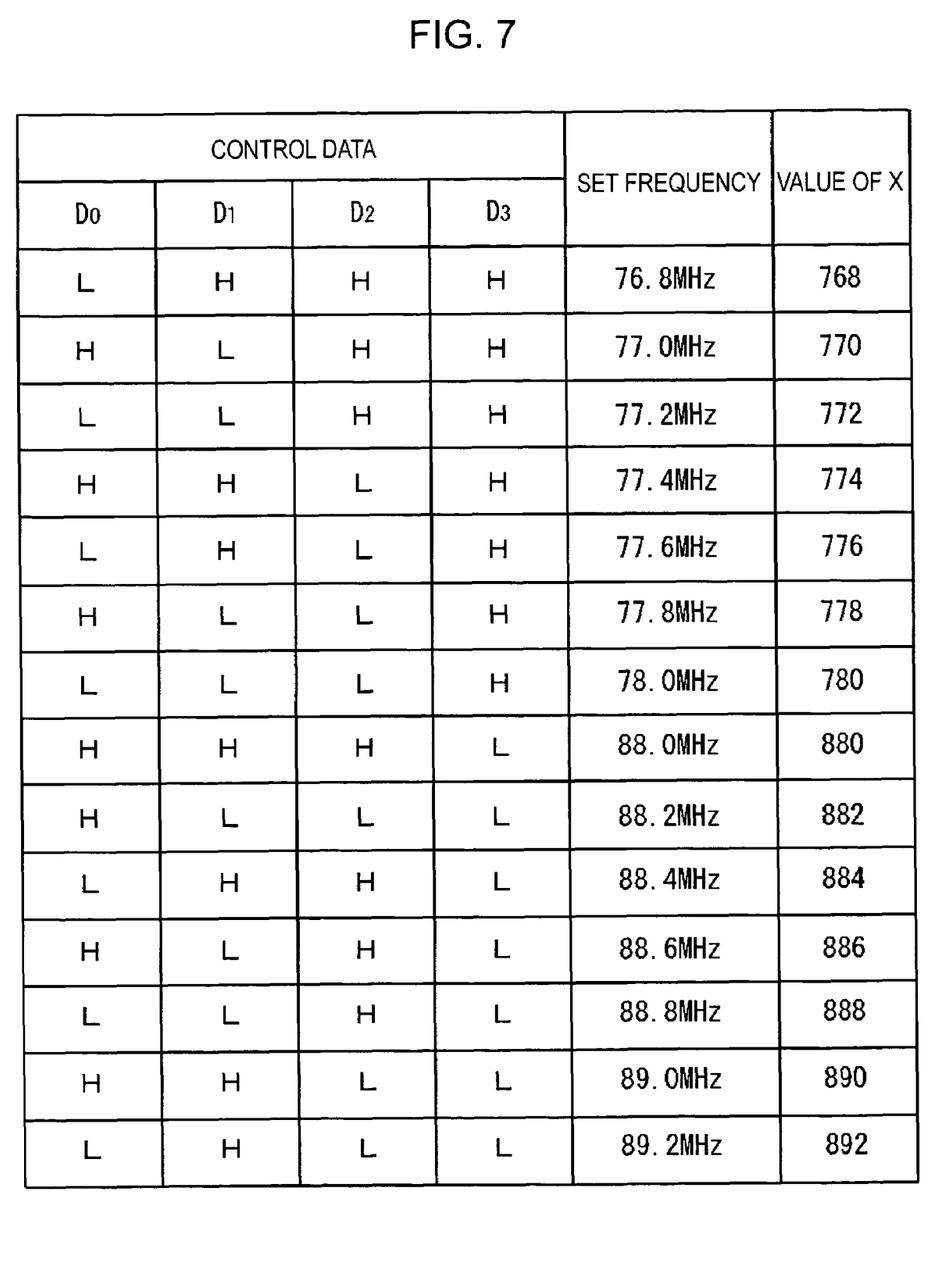
FIG. 7 shows the relationship between a set transmit frequency and control data.

The control signals D0 to D3 for respective channels rise to logic "1" (that is, "H") or fall to logic "0" (that is, "L") in a pattern corresponding to the transmit frequency set by the user, as shown in FIG. 7. This pattern changes depending on the set transmit frequency. For example, when the transmit frequency is set to 76.8 MHz, the logic levels of the control signals D0 to D3 for first to fourth channels are set to "0", "1", "1", and "1", respectively. When the transmit frequency is set to 77.0 MHz, the logic levels of the control signals D0 to D3 for the first to fourth channels are set to "1", "0", "1", and "1", respectively.

The program counter circuit 56 generates a comparison signal S10 of approximately 100 kHz. In accordance with the set transmit frequency, which is recognized from the pattern of the logic levels of the control signals D0 to D3 supplied from the switching circuit 57, the comparison signal S10 is generated by multiplying the FM modulation signal S7 supplied from the RF amplifier 53 by the reciprocal of the transmit frequency, in other words, the reciprocal of the value indicated in the column "value of X" in FIG. 7, that is, 1/X. The program counter circuit 56 transmits the generated comparison signal S10 to a phase-locked loop (PLL) 59.

The clock CLK2 output from the first frequency divider 48 is 1/19 frequency-divided by a fourth frequency divider 58 to produce a clock CLK4 of approximately 100 kHz. The clock CLK4 is supplied to the PLL circuit 59. Accordingly, the PLL circuit 59 compares the phase of the comparison signal S10 received from the program counter circuit 56 and the phase of the clock CLK4 received from the fourth frequency divider 58. Then, the PLL circuit 59 transmits a PLL signal S11 for synchronizing the phases to the voltage-controlled oscillator circuit 52. The voltage-controlled oscillator circuit 52 changes the capacitance of the diode of the carrier frequency determination unit in accordance with the PLL signal S11.

Thus, the voltage-controlled oscillator circuit 52 FM-modulates the stereo composite signal S6, which is received from the adding circuit 50, to a signal of a carrier frequency corresponding to the capacitance of the diode of the carrier frequency determination unit, that is, to a signal of the transmit frequency set by operating the frequency selection dial 25 (see FIG. 1).

Accordingly, in the FM transmitter 20, the audio signals S1L and S1R input from the portable audio apparatus 31 (see FIG. 3) via the headphone mini plug 28 can be FM-modulated at a transmit frequency set by the user and emitted from the antenna cable 29 (see FIG. 1).

With the foregoing structure, in the FM transmitter 20, the FM modulation signal S8, which is generated based on the audio signals S1L and S1R (see FIG. 5) supplied from the portable audio apparatus 31 (see FIG. 3) connected via the headphone mini plug 28, is transmitted as a leakage radio wave via the antenna cable 29.

Thus, in the FM transmitter 20, by mounting the antenna cable 29 along the interior trim of a vehicle to a position near the antenna 32 of the vehicle, a transmission quality adequate from a practical point of view can be ensured even in a space in which a large environmental change occurs, such as a cabin of the vehicle. Thus, when the field intensity of a reception point is constant, the FM transmitter 20 achieves the same effect with a smaller transmission output compared with a case where the FM transmitter 1 shown in FIG. 8 or the FM transmitter 10 shown in FIG. 9 is used.

In addition, in the FM transmitter 20, since the antenna cable 29 is formed by the twisted-pair cable 29A, the antenna cable 29 has a high flexibility. Thus, compared with a case where another leakage transmission line is used as an antenna cable having a predetermined length, the storage capability and portability of the antenna cable 29 can be dramatically improved. Furthermore, in a case where the antenna cable 29 is mounted along the interior trim of a vehicle, by improving the flexibility of mounting the antenna cable 29, such a mounting operation can be performed easily.

In addition, in the FM transmitter 20, the FM modulation signal S8, which is generated based on the audio signals S1L and S1R supplied from the portable audio apparatus 31, is converted from the unbalanced mode to the balanced mode by the balun 55 and transmitted via the antenna cable 29. Thus, the FM transmitter 20 is much less likely to be affected by the use environment of a vehicle or the like, and stable transmission of FM radio waves can be achieved.

With the foregoing structure, after the FM modulation signal S8, which is generated based on the audio signals S1L and S1R supplied from the portable audio apparatus 31 connected via the headphone mini plug 28, is converted from the unbalanced mode to the balanced mode by the balun 55, the converted FM modulation signal S8 is transmitted as a leakage radio wave via the antenna cable 29 formed by the twisted-pair cable 29A. Thus, the leakage radio wave from the antenna cable 29 can be received in a good condition at the antenna 32 without being interrupted by the body of a vehicle. Thus, an FM transmitter that is less likely to be affected by the environment and that achieves stable transmission of radio waves can be realized.

Although the present invention is applied to an on-vehicle FM transmitter in the foregoing embodiment, the present invention is not limited to this. The present invention is also applied to various transmitters, such as portable FM transmitters that are not mounted in vehicles, fixed FM transmitters that are used at home, and transmitters in which an externally supplied audio signal is modulated according to a predetermined modulation system other than FM modulation and transmitted.

In addition, although the twisted-pair cable 29A (see FIG. 5) whose one end is terminated with a characteristic impedance is used as a leakage transmission line used for an antenna in the foregoing embodiment, the present invention is not limited to this. For example, a balanced feeder wire whose one end is terminated with a characteristic impedance or a leakage co-axial cable whose one end is terminated with a characteristic impedance may be used. In addition, various other types of leakage transmission lines may be used as leakage transmission lines used for antennas.

In addition, although the balun 55 has the structure shown in FIG. 6 in the foregoing embodiment, the present invention is not limited to this. Various other structures are also possible.

In addition, although the antenna cable 29 has a length of, for example, three meters in the foregoing embodiment, the present invention is not limited to this. When the length of the antenna cable 29 is set so that an antenna of a vehicle receives radio waves, the antenna cable 29 may have any length as long as various conditions, such as the transmission power of the FM transmitter 20, the position of the antenna of the vehicle, and the length of body of the vehicle, are taken into consideration.

In addition, although the present invention is applied to the FM transmitter 20 of a type in which the power is supplied from a cigar lighter socket of a vehicle in the foregoing embodiment, the present invention is not limited to this. The present invention is widely applicable to other types of FM transmitter, such as an FM transmitter using a battery as a power source.

The present invention is widely applicable to various other types of transmitters as well as on-vehicle FM transmitters.

It should be understood by those skilled in the art that various modifications, combinations, sub-combinations and alterations may occur depending on design requirements and other factors insofar as they are within the scope of the appended claims or the equivalents thereof.

What is claimed is:

1. A transmitter apparatus for use in an automobile having an automobile antenna, said transmitter apparatus being operable to receive an audio signal reproduced from an audio reproducing device separate from the transmitter apparatus and to wirelessly transmit a signal corresponding to the audio signal for reception by the automobile antenna, said transmitter apparatus comprising:

plug means for insertion into a jack input of the audio reproducing device so as to enable the reproduced audio signal to be received therefrom;

a process circuit to process the received reproduced audio signal so as to form a processed audio signal;

modulation means for modulating the processed audio signal according to a predetermined modulation system and producing a modulation signal therefrom;

balance conversion means for converting the modulation signal from an unbalanced mode into a balanced mode; and an antenna having a length of approximately three meters formed by a leakage transmission line, the antenna being operable to be arranged inside the automobile such that an end thereof is located near the automobile antenna, and during operation, the antenna emits the modulation signal converted into the balanced mode for reception by the automobile antenna.

2. The transmitter apparatus according to claim 1, in which the process circuit includes a level adjusting circuit having an attenuator and an input level switch which enables a user to selectively attenuate or not attenuate the received reproduced audio signal.

* * * * *